United States Patent
Vos et al.

(10) Patent No.: US 11,183,035 B2
(45) Date of Patent: Nov. 23, 2021

(54) VIDEO DOORBELL VISITOR FILTRATION APPARATUSES AND DATE-TIME SYSTEM METHODS OF OPERATION

(71) Applicant: Eagle Eye Networks, Inc, Austin, TX (US)

(72) Inventors: Tijmen Vos, Amsterdam (NL); Zeynep Yurdakul, Amsterdam (NL); Bernard Maassen, Amsterdam (NL); Wouter Lauret, Amsterdam (NL)

(73) Assignee: EAGLE EYE NETWORKS, INC., Austin, TX (US)

( * ) Notice: Subject to any disclaimer, the term of this patent is extended or adjusted under 35 U.S.C. 154(b) by 0 days.

(21) Appl. No.: 16/924,038

(22) Filed: Jul. 8, 2020

(65) Prior Publication Data
US 2020/0342723 A1 Oct. 29, 2020

Related U.S. Application Data

(63) Continuation-in-part of application No. 16/186,659, filed on Nov. 12, 2018, now abandoned.

(51) Int. Cl.
*G08B 3/10* (2006.01)
*G08B 27/00* (2006.01)
*G08B 19/00* (2006.01)

(52) U.S. Cl.
CPC ............ *G08B 3/10* (2013.01); *G08B 19/005* (2013.01); *G08B 27/005* (2013.01)

(58) Field of Classification Search
None
See application file for complete search history.

(56) References Cited

U.S. PATENT DOCUMENTS

| | | | |
|---|---|---|---|
| 10,347,063 B1* | 7/2019 | LaRovere | G07C 1/32 |
| 10,846,960 B1* | 11/2020 | Lemberger | G06K 9/00771 |
| 2015/0035987 A1* | 2/2015 | Fernandez | H04N 7/186 348/156 |
| 2018/0075681 A1* | 3/2018 | Scalisi | G06K 9/00771 |
| 2019/0095644 A1* | 3/2019 | Park | G05B 15/02 |
| 2019/0309539 A1* | 10/2019 | Mukundala | E05B 65/0032 |

* cited by examiner

*Primary Examiner* — John F Mortell
(74) *Attorney, Agent, or Firm* — Patentry; Peter G.H. Hwang (57) ABSTRACT

A system enables a scheduled visitor to receive an optical credential in paper or electronic form, and a range of date-time validity for a video doorbell which may actuate a portal. Upon activation the video doorbell hashes the optical credential with the date-time of the actual access request, masked to a range of most significant bits to create a plurality of digital bit-keys. The bit-keys generated exclusively at that video doorbell at that time would be verified with a stored digital bit-lock which is a complementary transformation of the valid date-time range hashed with the original optical credential at a visitor filtration server. Overwriting a stored digital bit-lock in a video doorbell at any time effectively cancels access by that optical credential. An emergency access key phrase communicatively couples the video doorbell with a visitee interview panel overriding access policies. Installation of custom software on the visitor's terminal is unnecessary.

5 Claims, 11 Drawing Sheets

VIDEO DOORBELL VISITOR FILTRATION APPARATUSES AND DATE-TIME SYSTEM METHODS OF OPERATION

CROSS-REFERENCE TO RELATED APPLICATIONS

This is a Continuation-In-Part application of application Ser. No. 16/186,659 Filed: Nov. 12, 2018 "Secure Video Doorbell Visitor Filtration System and Method of Operation" which in incorporated by reference and provides the benefit of its priority date.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Technical Field

The disclosure relates to video security systems and physical access control.

Background

As is known wireless security is vulnerable when two know a secret. A well-known problem is safely exchanging or transmitting keys in physical or electronic reality. Man in the middle attacks are common and make key transmission highly risky when the same key travels twice or on two paths.

As is known, "irreversible" transformations are a term of art among mathematicians and computer scientists indicating a belief that even as computational power increases, new transformations such as evolving hashes will be devised which would make "dehashing" impractical or highly uneconomic. Applicant uses "irreversible" practically and not conceptually.

What is needed is a long sought solution for the problem of physical key exchange for occasional visitors. What is needed is just-in-time and just-in-place key generation. What is needed is a way to retract access from a previously authorized visitor before a scheduled expiration date. What is needed is a way to support occasional visitors without requiring that they trust installation of proprietary executable code on their mobile devices.

SUMMARY OF INVENTION

A key is digitally generated at a video doorbell apparatus within a date-time range. A corresponding lock is stored or overwritten into the specific video doorbell. An irreversible transformation generates the lock with a valid date-time range. To actuate a portal coupled to the video doorbell, a scheduled visitor must present an optical credential to the video doorbell within the valid date-time range. At any time, overwriting the lock cancels the key and immediately denies access.

A system enables a scheduled visitor to receive an optical credential in paper or electronic form, and a range of date-time validity for a video doorbell which may actuate a portal. Upon activation the video doorbell hashes the optical credential with the date-time of the actual access request, masked to a range of most significant bits to create a plurality of digital bit-keys. The bit-keys generated exclusively at that video doorbell at that time would be verified with a stored digital bit-lock which is a complementary transformation of the valid date-time range hashed with the original optical credential at a visitor filtration server. Overwriting a stored digital bit-lock in a video doorbell at any time effectively cancels access by that optical credential. An emergency access key phrase communicatively couples the video doorbell with a visitee interview panel overriding access policies. Installation of custom software on the visitor's terminal is unnecessary.

This includes receiving a credential presented to the video doorbell; verifying the credential is valid for the location of the video doorbell and the date-time is within a valid range; transmitting a notification; and playing an outgoing message/instruction.

The method for determining a data-time when a video doorbell is actuated by a scheduled visitor includes: generating a credential for a visitor to access a portal; determining a range of date-time for validity of the credential; distributing the credential to a communication device of the visitor; transforming the credential and the range of valid date-time into a first encrypted code; distributing the first encrypted code to the portal.

A method at the video doorbell, includes receiving the first encrypted code; optionally receiving the credential from a communication device of the visitor at a date-time, transforming the date-time of reception and the credential into a second encrypted code, and verifying the first encrypted code with the second encrypted code. The codes are not identical.

The method includes, receiving a valid date-time access range for a scheduled visitor, an identity indicia for said scheduled visitor, and indicia of the video doorbell which said scheduled visitor may activate within said valid date-time access range at the visitee interview panel. The method also includes generating an optical credential for said scheduled visitor, transmitting said optical credential, a location of said video doorbell, and said valid date-time access range to said scheduled visitor's terminal, and, enabling the video doorbell to activate a digital bit-lock by a digital bit-key at the visitor filtration server. The server enables the video doorbell by determining most significant bits of said valid date-time access range, generating a mask of the most significant bits, and then generating a digital bit-lock for a combination of the optical credential and said valid date-time access range; and, storing into said video doorbell said generated digital bit-lock. The method includes, receiving the digital bit-lock and storing it, generating a plurality of digital bit-keys upon activation by scheduled visitor, wherein generating a plurality of digital bit-keys comprises receiving an optical credential, determining a requested access date-time, generating a plurality of masks of most significant bits of requested access date-time, hashing each one of the plurality of masks and the optical credential to determine the plurality of digital bit-keys, and enabling the portal actuator when any of the plurality of digital bit-keys is verified in combination with the stored digital bit-lock at a video doorbell apparatus coupled to said visitor filtration server and to said portal actuator. The method includes generating a digital bit-lock by hashing said mask of most significant bits and said optical credential to determine a hash, and determining a two's complement of said hash at the server; and, determining verification in combination is successful when any digital bit-key summed with the stored digital bit-lock has a value of zero at the video doorbell.

A system enables a visitor filtration apparatus to encode and store time-windows for expected visitors and generate time limited optical credentials per visitor and policies to greet, transform messages from, and determine various access to visitors.

The system includes at least a video doorbell (videoorbell) having electronic and audio communication circuits, a camera, and a processor. The system couples to an interview panel by which a visitee stores outgoing messages, date-time windows, access policies, and visitor indicia and attends to incoming messages in delayed or real time.

A secure optically encoded credential such as a QR is transmitted to an expected visitor with its date-time validity. A transformed secure optically encoded credential is stored in a visitor filtration apparatus and then into a videoorbell.

Various policies provide for physical access control or electronic access by direct coupling or stored messages. Policies operate on date-time of the visit, and visitor indicia which includes faces, voices, badges, uniforms, package delivery waybills, and combinations thereof.

A video doorbell component of the system triggers on image or audio capture, transforms and verifies optically encoded credentials and actuates a physical access control actuator, a visitor filtration apparatus, or relays images and audio with an interview panel. The optical credential, e.g. QR code, is transmitted electronically to an expected visitor and may be printed or displayed from an electronic media. Policies enable recognition of biometrically enhanced images of faces or faces with uniform hats such as emergency services agents. Messages are stored for replay or transmitted immediately.

The system may actuate a physical access control apparatus or couple the video doorbell directly to an interview panel of the visitee or of an intermediary, or present greetings or instructions and take audio-visual messages. Voice to text circuits may override stored policies for emergency keywords, e.g. "Fire."

In an embodiment, the system includes a visitor filtration apparatus performing instructions to store outgoing and incoming messages, secure optically encoded credentials, date-time policies and visitor indicia for individuals or for classes such as police, fire, postal employees, delivery agents, utility workers, and complete strangers (none of the above).

BRIEF DESCRIPTION OF DRAWINGS

The foregoing and other objects, aspects, features, and advantages of the disclosure will become more apparent and better understood by referring to the following description taken in conjunction with the accompanying drawings, in which.

DETAILED DESCRIPTION OF INVENTION

One aspect of the invention is a system for visitor filtration which has a network, mutually interconnecting: a visitee interview panel, a visitor filtration server, a scheduled visitor terminal which may print or display an optical credential, and at least one video doorbell apparatus which may scan said optical credential, coupled to a portal actuator.

Another aspect of the invention is a method of operation for a visitee interview panel, a visitor filtration server, a video doorbell, the method being processes performed asynchronously by circuits or by processers performing executable instructions encoded in non-transitory media, e.g. a computing device and environment, the processes including:

at the visitee interview panel, receiving a valid date-time access range for a scheduled visitor, receiving an identity indicia for said scheduled visitor, receiving indicia of the video doorbell which said scheduled visitor may activate within said valid date-time access range;

at the visitor filtration server, generating an optical credential for said scheduled visitor, transmitting said optical credential to a terminal of said scheduled visitor, transmitting a location of said video doorbell to said scheduled visitor's terminal, transmitting said valid date-time access range to said scheduled visitor's terminal, and, enabling said video doorbell to activate a digital bit-lock by a digital bit-key;

wherein, said enabling said video doorbell includes: determining most significant bits of said valid date-time access range, generating a mask of said most significant bits, and then generating a digital bit-lock for a combination of said optical credential and said valid date-time access range; and, storing into said video doorbell said generated digital bit-lock;

at a video doorbell apparatus coupled to said visitor filtration server and to said portal actuator, receiving from said visitor filtration server said digital bit-lock and storing said digital bit-lock, generating a plurality of digital bit-keys upon activation by said scheduled visitor, wherein generating a plurality of digital bit-keys includes receiving by an optical sensor, an optical credential, determining a requested access date-time upon reception of said optical credential, generating a plurality of masks of most significant bits of requested access date-time access, hashing each one of said plurality of masks and said optical credential to determine said plurality of digital bit-keys, and enabling the portal actuator when any of the plurality of digital bit-keys is verified in combination with said stored digital bit-lock; wherein generating a digital bit-lock at the server includes hashing said mask of most significant bits and said optical credential to determine a hash, and determining a two's complement of said hash; and, wherein verification in combination at the video doorbell is successful when any digital bit-key summed with the stored digital bit-lock has a value of zero.

An exemplary non-limiting process for determining when a video doorbell is actuated by a scheduled visitor includes generating a credential for a visitor to access a portal; determining a range of date-time for validity of the credential; distributing the credential to a communication device of the visitor; transforming the credential and the range of valid date-time into a first encrypted code; and distributing the first encrypted code to the portal.

At the video doorbell, one exemplary method includes receiving the first encrypted code; receiving the credential from the communication device of the visitor/service provider at a date-time, transforming the date-time of reception and the credential into a second encrypted code, and verifying the first encrypted code with the second encrypted code. The codes are not identical.

In an embodiment, the video doorbell hashes the optically encoded credential with one or more most significant bits of date-time and attempts to match the resulting hash with a stored transformation of the optically encoded credential sent to the visitor. Upon success or failure of matching, doors may be opened or not, messages can be presented to the visitor, direct communication with a selected interview panel can be coupled, or a message may be recorded for immediate or delayed delivery to the visitee.

Figure 1:
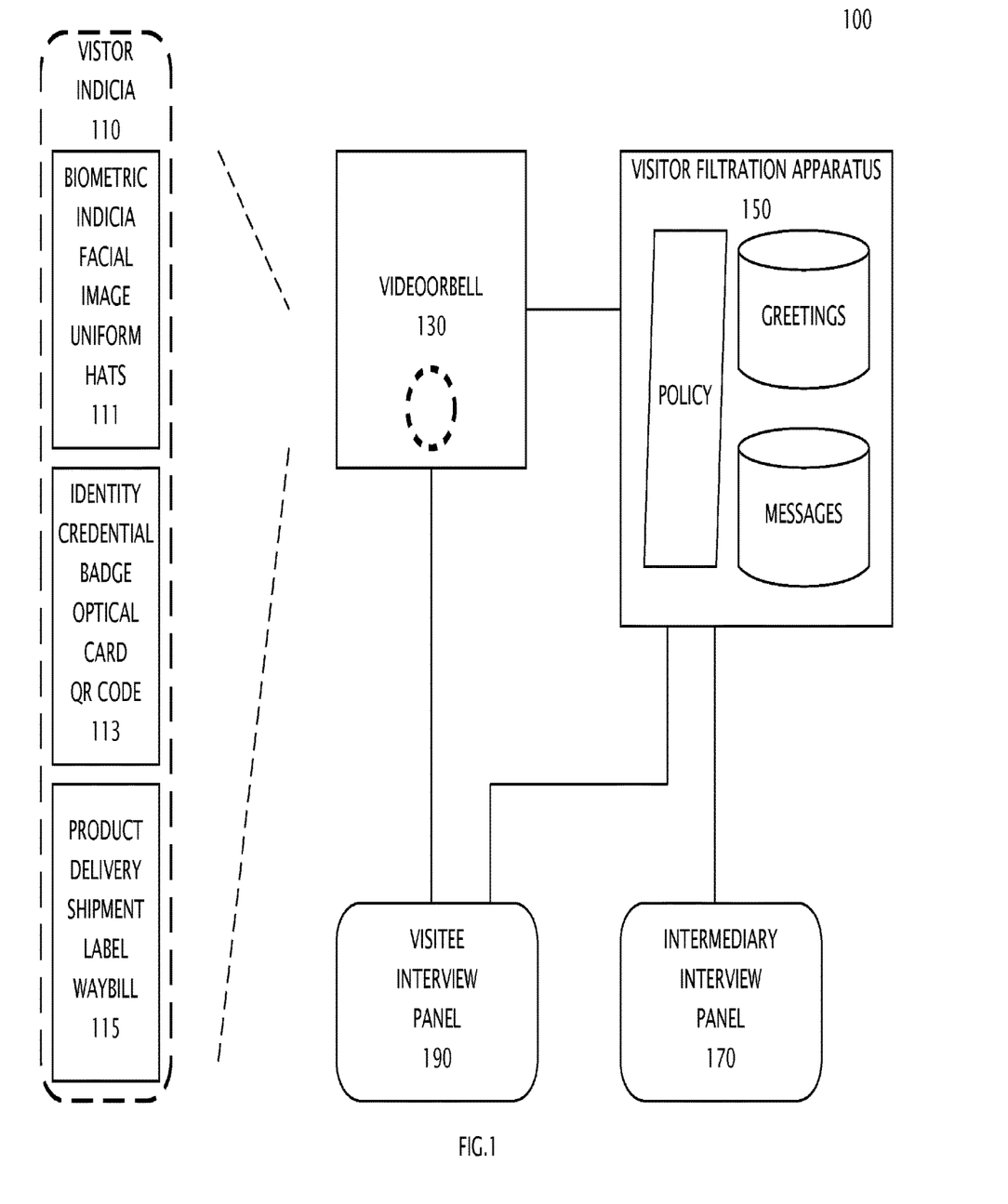
FIG. 1 is a block diagram of a system having a video doorbell, coupled to at least one interview panel, and in an embodiment, coupled to a visitor filtration apparatus.

Referring now to the exemplary figures and other non-limiting embodiments provided for clarification of aspects of the invention without constraining the breadth of the inventive concepts:

FIG. 1 is a block diagram of a system having a video doorbell (videoorbell) 130, coupled to a visitor filtration apparatus 150. Both the videoobell and the visitor filtration apparatus enable filtered communication with a selected visitee interview panel 190 or to an intermediary interview panel 170 based on date-time, policies, and visitor indicia.

Exemplary visitors 110 actuate the videoorbell 130 by triggering an audio or video sensor and presenting an optically encoded credential or biometric such as a face, voice, or a government agency credential such as an official warrant card or badge, or a package code, or a service provider identification. A hash or other transformation of date-time and an optically encoded credential is compared with a stored transformation of an optically encoded credential for an expected visitor to trigger a policy for physical access or electronic access. When no matching transformation is found, for example an unexpected visitor, visitor indicia is relayed to a visitor filtration apparatus 150. The visitor filtration apparatus 150 may present directions or greetings, store and forward messages, and apply policies based on stored identities and date-time of visit to connect in timeshifted or real-time to an intermediary interview panel 170 or to a visitee interview panel 190. Expected or high priority visitor indicia may be downloaded to the videoorbell for immediate and direct connection to a selected panel.

Figure 2:
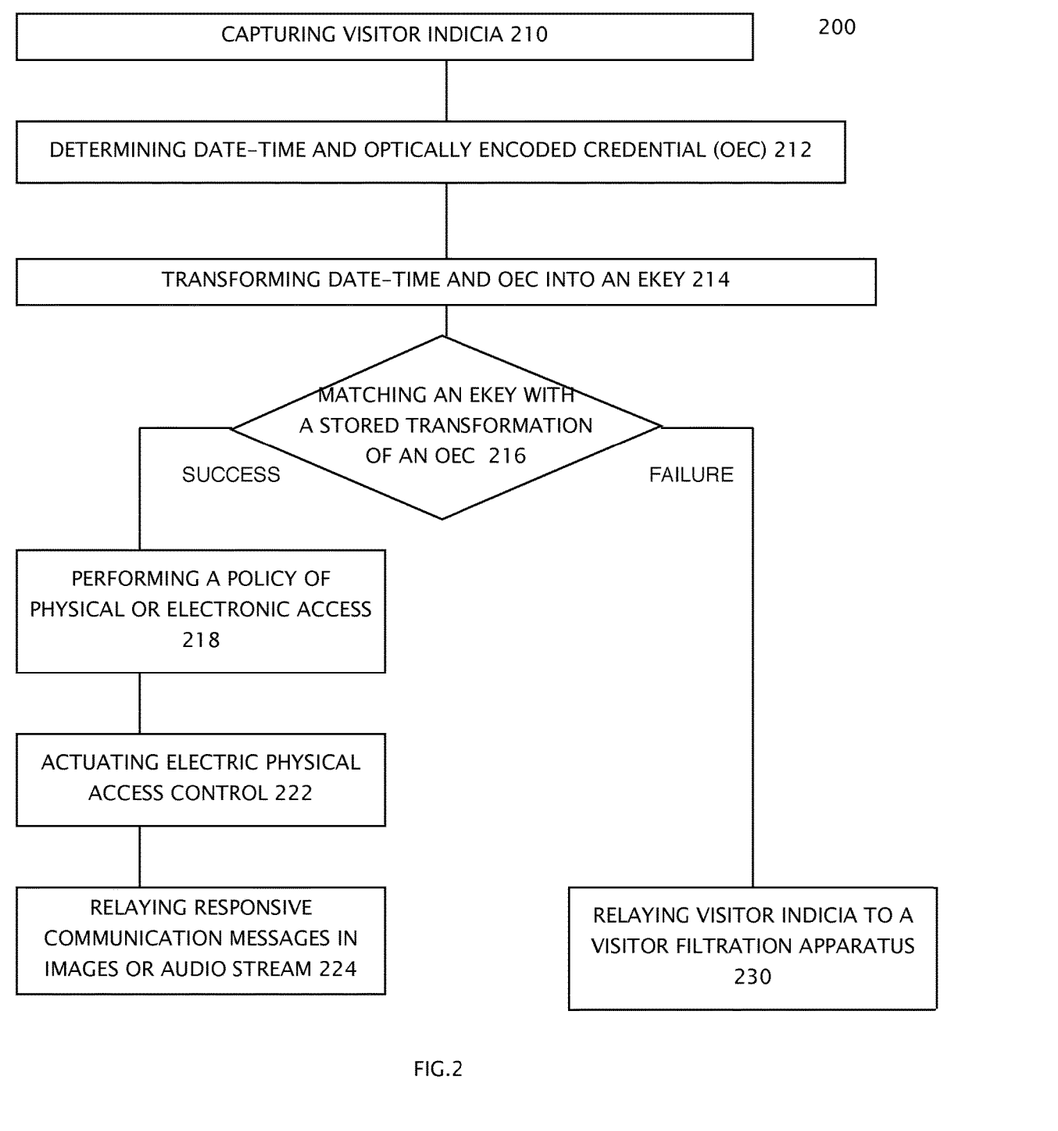
FIG. 2 is a flowchart of a method of operation for a video doorbell.

FIG. 2 is a flowchart of a first method 200 of operation for a videoorbell, upon activation, capturing visitor indicia 210 including at least one of an audio stream of a visitor, a still image of a visitor, a video stream of a visitor, and a credential encoded in computer-readable optical imagery; determining date-time and optically encoded credential 212; transforming said date-time and optically encoded credential into ekey 214; matching said ekey with a stored transformation of an optically encoded credential 216; performing upon successful matching, a policy of physical or electronic access enablement 218; and upon failed matching, relaying said visitor indicia to a visitor filtering apparatus 230; wherein said policy of access enablement includes but is not limited to actuating electric physical access controls 222 and relaying (receiving, transmitting, transforming, and presenting) responsive communication messages in images or audio stream 224.

Figure 3:
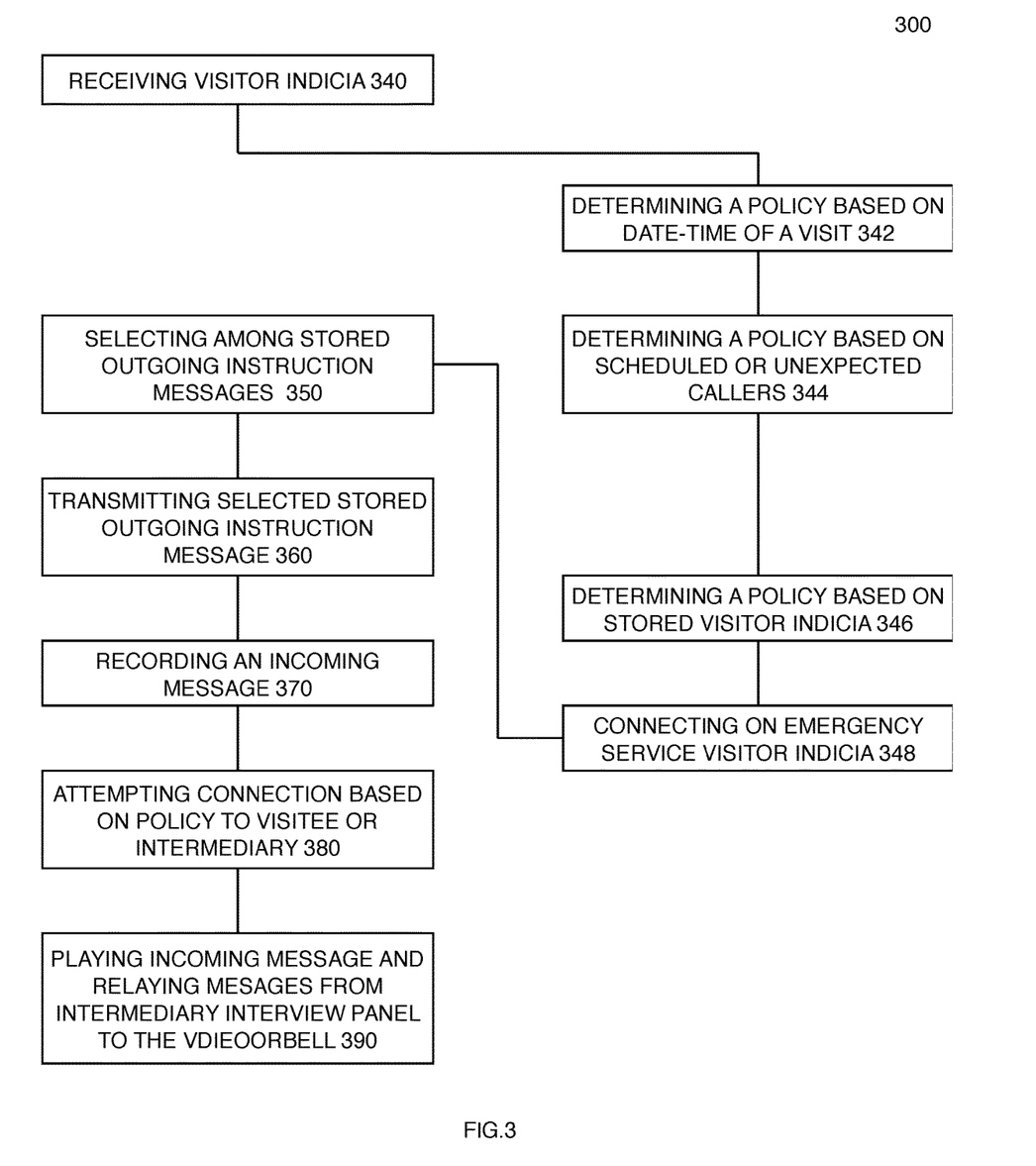
FIG. 3 is a flowchart of various non-limiting embodiments of methods for operation of a visitor filtration apparatus communicatively coupled to a video doorbell and to an interview panel

FIG. 3 is a flowchart 300 of various non-limiting embodiments of methods for operation of a visitor filtration apparatus communicatively coupled to a video doorbell and to an interview panel, receiving visitor indicia 340, determining a policy based on date-time of a visit 342, determining a policy based on scheduled or unexpected callers 344, determining a policy based on stored visitor indicia such as faces, badges, packages, service provider identity documentation 346; connecting immediately on the condition of emergency service visitor indicia 348; selecting among a plurality of stored outgoing instruction messages 350, transmitting the selected stored outgoing instruction message 360, recording an incoming message 370, and attempting connection based on date-time policy to one of a visitee interview panel and an intermediary interview panel such as a legal service provider 380; and upon successful connection playing the incoming message and relaying responsive communication messages from the intermediary interview panel to the videoorbell 390.

Figure 4:
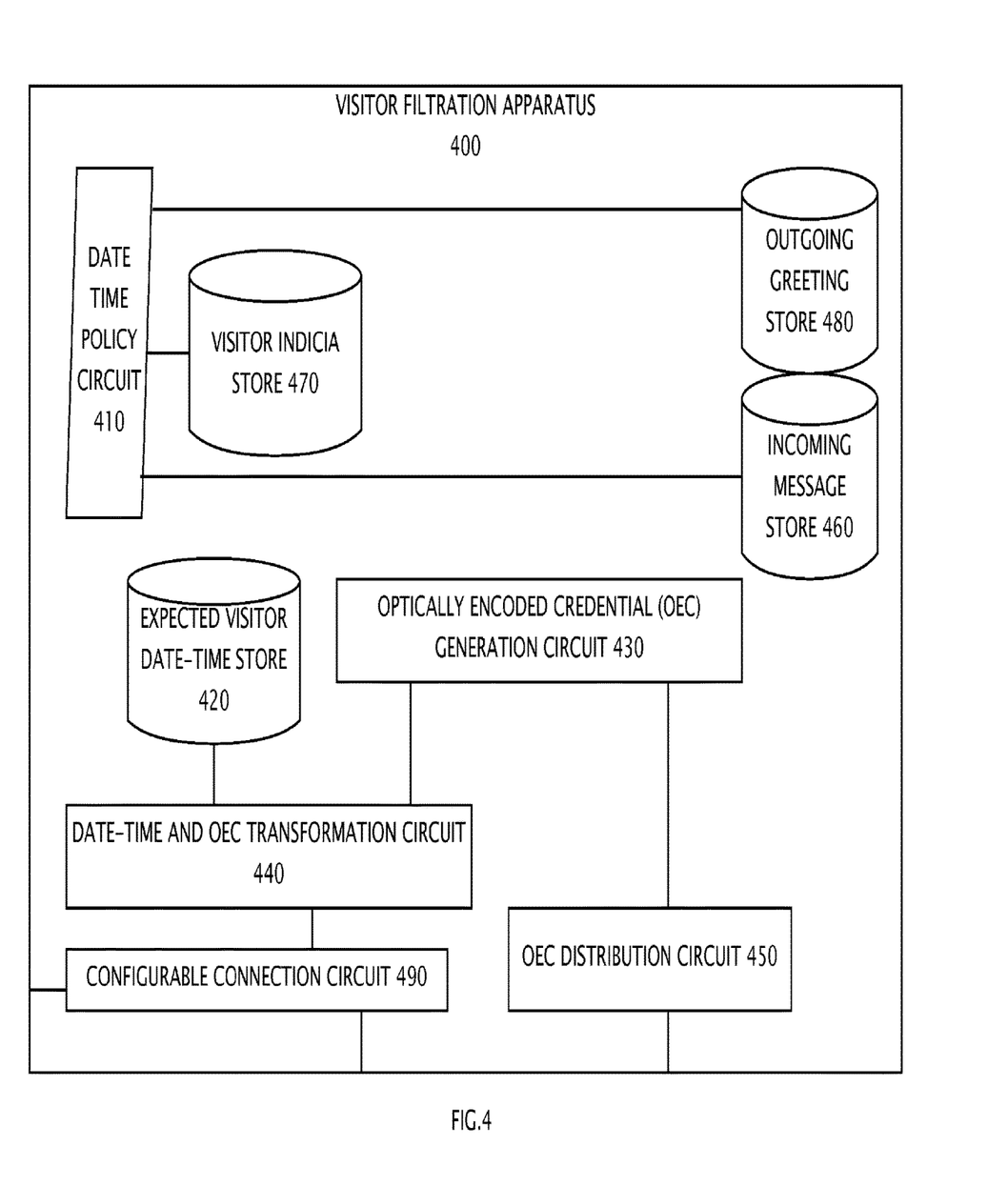
FIG. 4 is a block diagram of a first visitor filtration apparatus component of the invention.

FIG. 4 is a block diagram of a first apparatus embodiment of a visitor filtration apparatus 400 the apparatus comprising: a date-time policy circuit 410; an expected visitor date-time appointment range store 420; an optically encoded credential generation circuit 430; a date-time and optically encoded credential transformation circuit 440; an optically encoded credential distribution circuit 450; an incoming message store 460; a visitor indicia store 470; an outgoing greeting store 480; and a configurable connection circuit 490 which determines if and when a visitor or message is communicatively coupled to a selected visitee interview panel or intermediary interview panel. Non-limiting examples of an optically encoded credential distribution circuit include a radio, a cellular baseband processor, a Simple Mail Transfer Protocol email server, a Short Message Service client, and a Portable Document Format image fax server.

Figure 5:
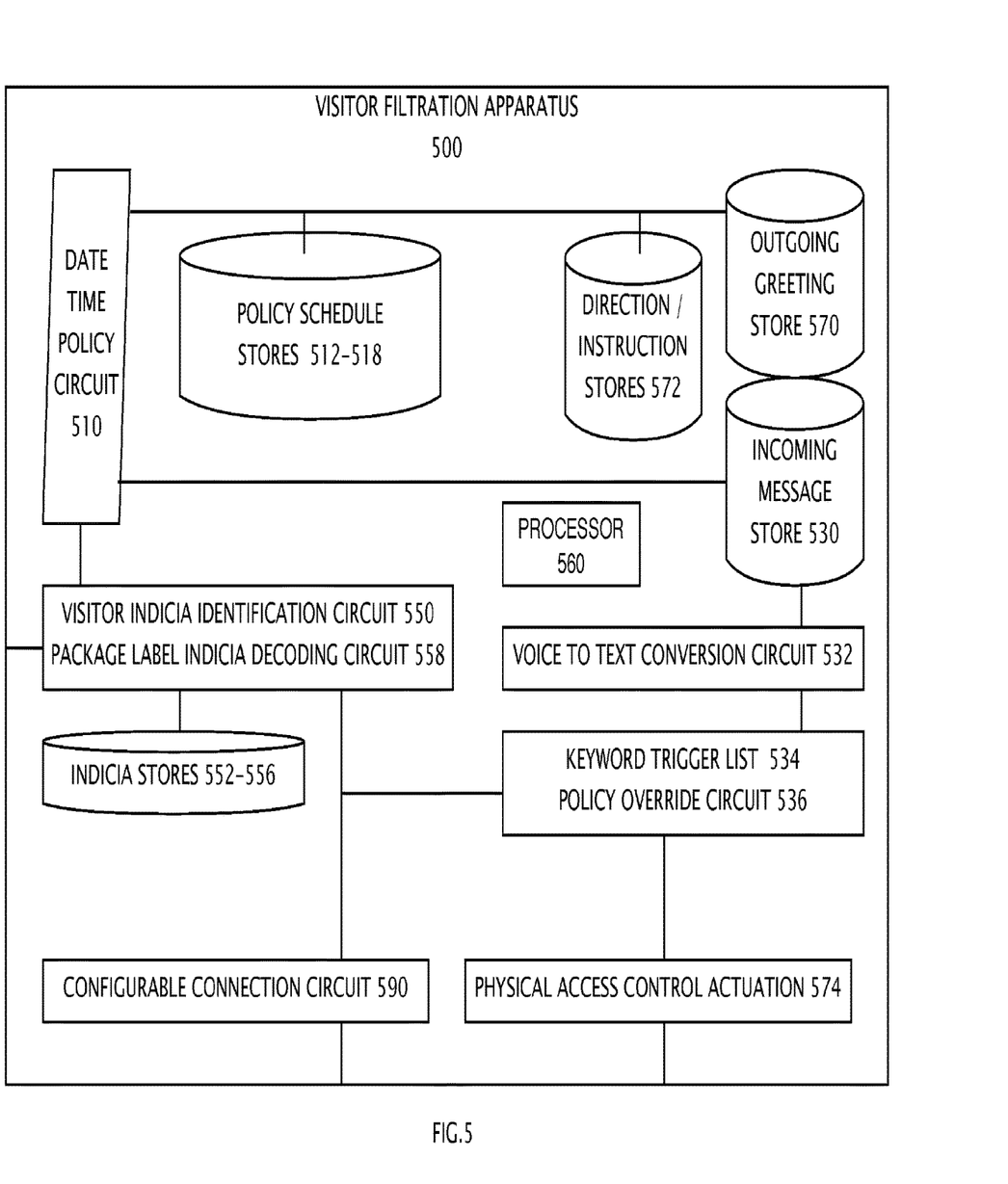
FIG. 5 is a block diagram of embodiments of a visitor filtration apparatus.

FIG. 5 is a block diagram of embodiments of a visitor filtration apparatus 500 which includes circuits distributable among displays, videoorbells, custom or programmable chips, and processors performing instructions encoded and readable from non-transient media, embodiments of the apparatus comprising at least one of: a date-time policy circuit 510; a policy store of when visitors of certain types may be connected 512; a policy store of which outgoing greetings are played by visitor indicia 514; a policy store of when incoming messages are relayed to the visitee interview panel 516; a schedule store of when certain visitors are expected 518; an incoming message store 530; a voice to text conversion circuit 532; a keyword trigger list 534; a policy override trigger responsive to keywords 536; a visitor indicia identification circuit 550; a government agency identity indicia store 552; a service identity indicia store 554; a personal visitor biometric indicia store 556; a package label indicia decoding circuit 558; an outgoing greeting store 570; a selectable direction or instruction message store 572; a physical access control actuation circuit 574; and a configurable connection circuit 590 which determines if and when a visitor or message is communicatively coupled to a selected visitee interview panel or to an intermediary interview panel; said circuits and stores mutually coupled communicatively with a processor 560. Non-limiting examples of an intermediary include a trustee, a parent, a conservator, an adult child, a legal services provider, an attorney, and an executive assistant. In exemplary embodiments, a keyword trigger list includes audio files for "Fire", "Police", "Help", "Lost Key", and "family's secret word is . . . ".

Figure 7:
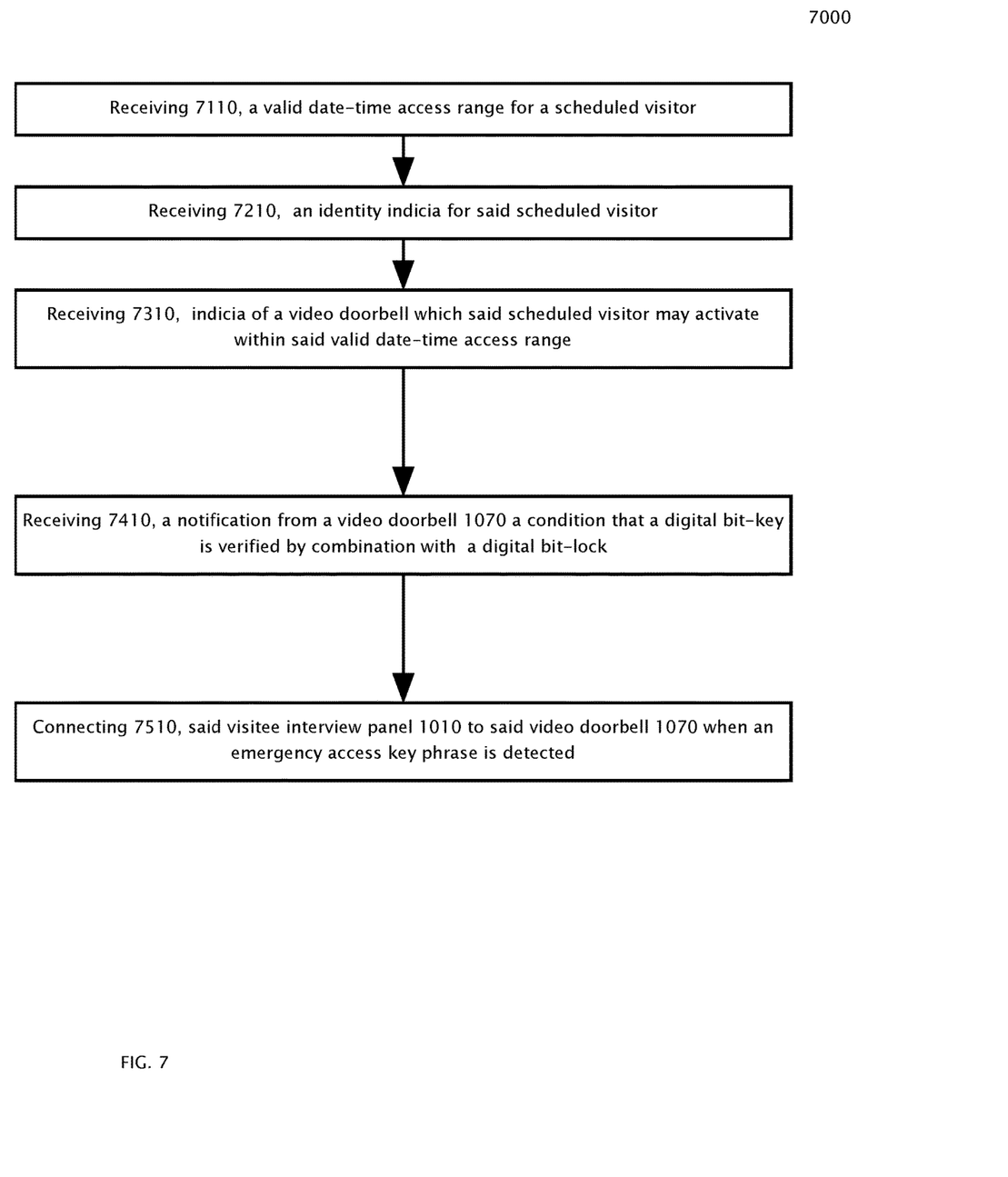
FIG. 7 is a diagram of processes at a visitee interview panel, which may be performed out of order and include processes only found in embodiments.

FIG. 7 is a flowchart of a method 7000 of operation for the system at a visitee interview panel 1010: receiving 7110, a valid date-time access range for a scheduled visitor; receiving 7210, an identity indicia for said scheduled visitor; receiving 7310, indicia of a video doorbell which said scheduled visitor may activate within said valid date-time access range;

receiving 7410, a notification from a video doorbell 1070 a condition that a digital bit-key is verified by combination with a digital bit-lock; and, connecting 7510, said visitee interview panel 1010 to said video doorbell 1070 when an emergency access key phrase is detected, e.g. "Grandpa Quaff, I lost my phonograph", "Hide, hide, a cow's outside".

Figure 8:
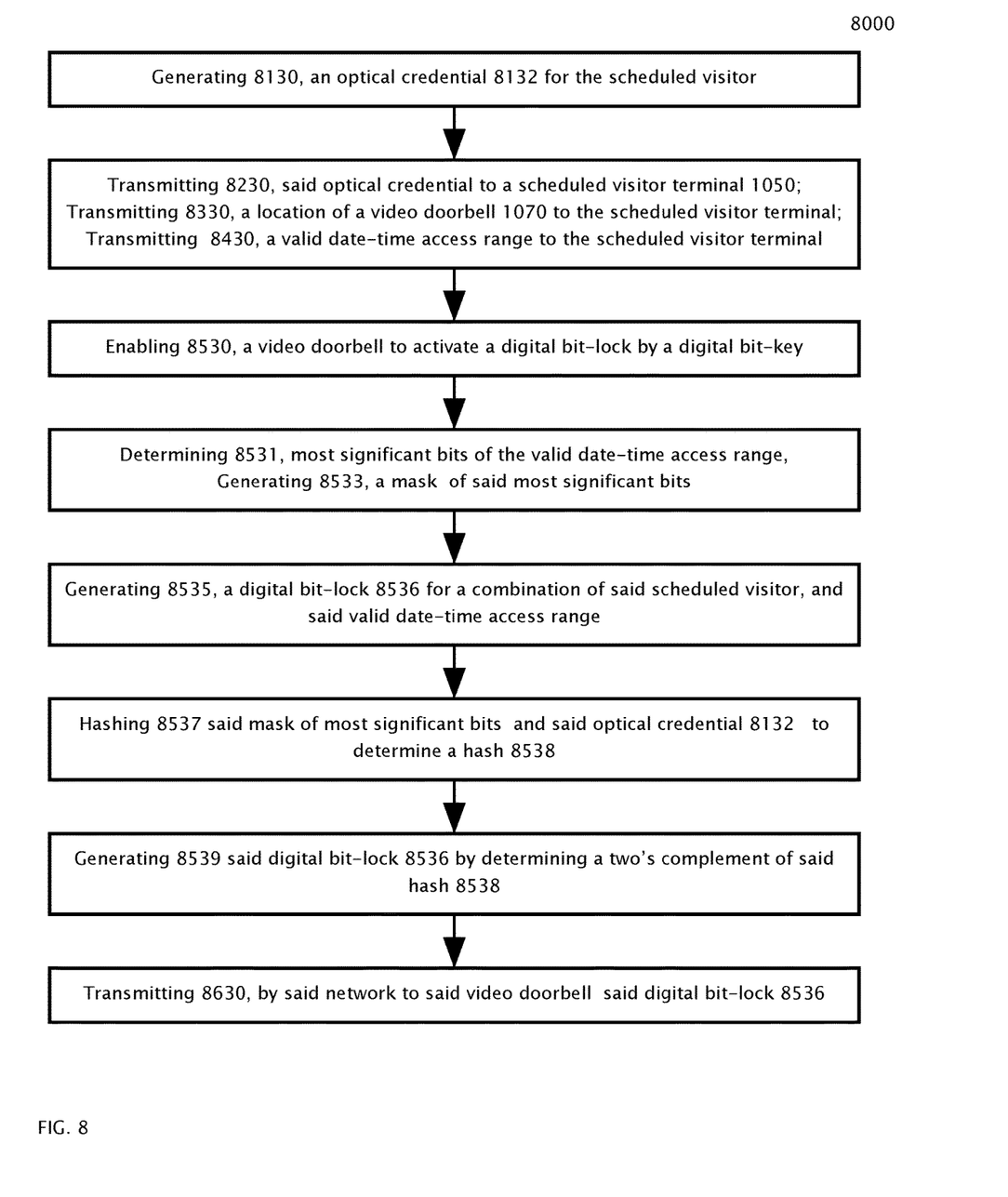
FIG. 8 is a diagram of processes at a visitor filtration server in flowchart form which may be performed in some cases not in strict sequence

FIG. 8 is a flowchart of a method 8000 of operation for the system at a visitor filtration server 1030 comprising the processes of: generating 8130, an optical credential 8132 for the scheduled visitor; transmitting 8230, said optical credential to a scheduled visitor terminal 1050; transmitting 8330, a location of a video doorbell 1070 to the scheduled visitor terminal; transmitting 8430, a valid date-time access range to the scheduled visitor terminal; and, enabling 8530, a video doorbell to activate a digital bit-lock by a digital bit-key;

wherein, said enabling 8530 a video doorbell includes: determining 8531, most significant bits of the valid date-time access range, generating 8533, a mask of said most significant bits, generating 8535, a digital bit-lock 8536 for a combination of said scheduled visitor, and said valid date-time access range; wherein, generating a digital bit-lock includes:

hashing 8537, said mask of most significant bits and said optical credential 8132 to determine a hash 8538; generating 8539, said digital bit-lock 8536 by determining a two's complement of said hash 8538; and transmitting 8630, by said network to said video doorbell said digital bit-lock 8536.

Figure 9:
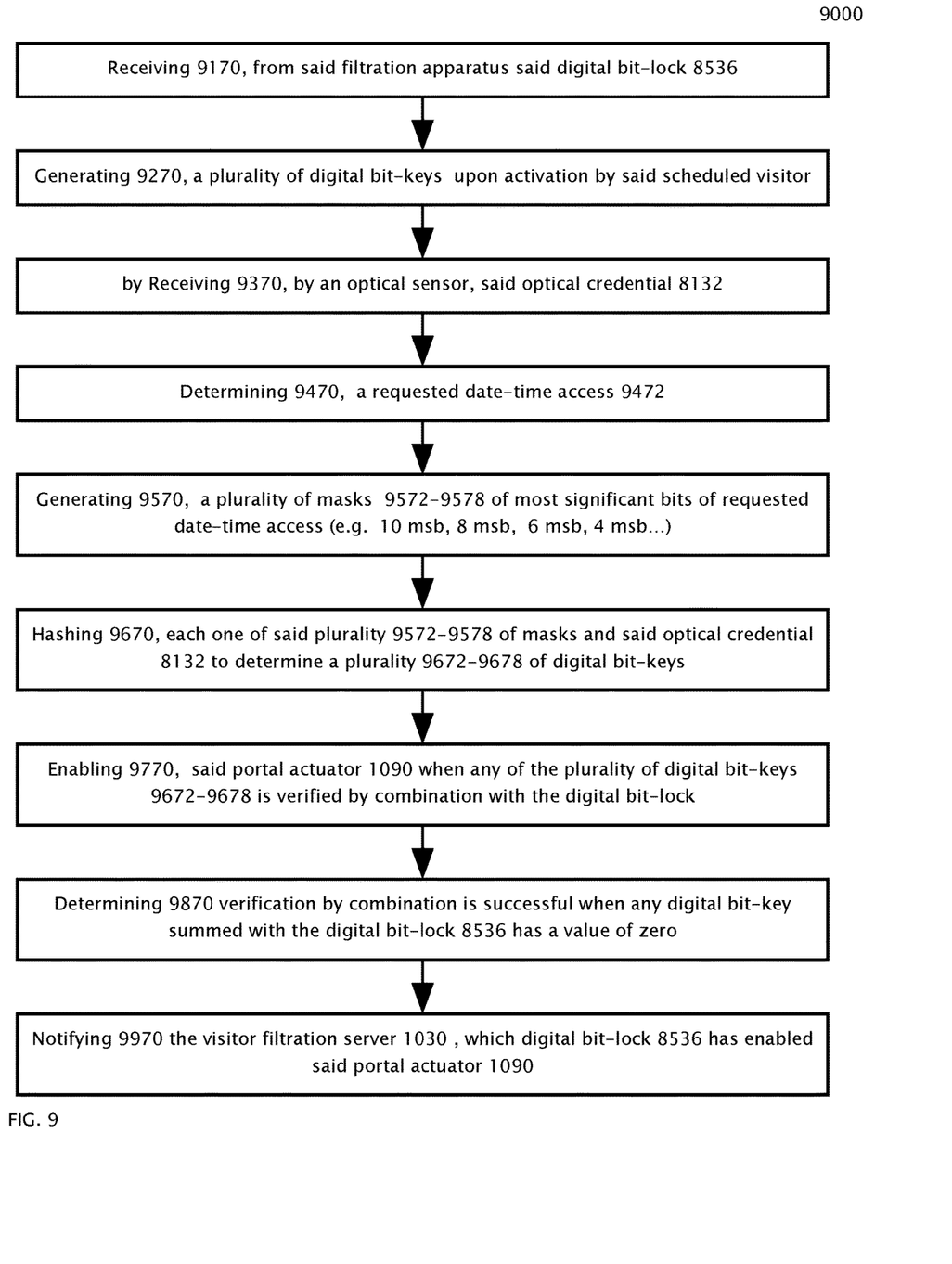
FIG. 9 is diagram of processes at a video doorbell in flowchart form, some of which may be performed in parallel, overlapped, or different order.

FIG. 9 is a flowchart of a method 9000 of operation for the system at a video doorbell apparatus 1070 coupled to said visitor filtration server 1050 and to said portal actuator 1090, comprising the processes of: receiving 9170, from said filtration apparatus said digital bit-lock 8536; generating 9270, a plurality of digital bit-keys upon activation by said scheduled visitor; wherein generating a plurality of digital bit-keys includes: receiving 9370, by an optical sensor, said optical credential 8132; determining 9470, a requested date-time access 9472 upon reception of said optical credential; generating 9570, a plurality of masks 9572-9578 of most significant bits of requested date-time access (e.g. 10 msb, 8 msb, 6 msb, 4 msb . . . ); hashing 9670, each one of said plurality 9572-9578 of masks and said optical credential 8132 to determine a plurality 9672-9678 of digital bit-keys; enabling 9770, said portal actuator 1090 when any of the plurality of digital bit-keys 9672-9678 is verified by combination with the digital bit-lock. Determining 9870, verification by combination is successful when any digital bit-key summed with the digital bit-lock 8536 has a value of zero; and, notifying 9970, the visitor filtration server 1030, which digital bit-lock 8536 has enabled said portal actuator 1090.

Figure 10:
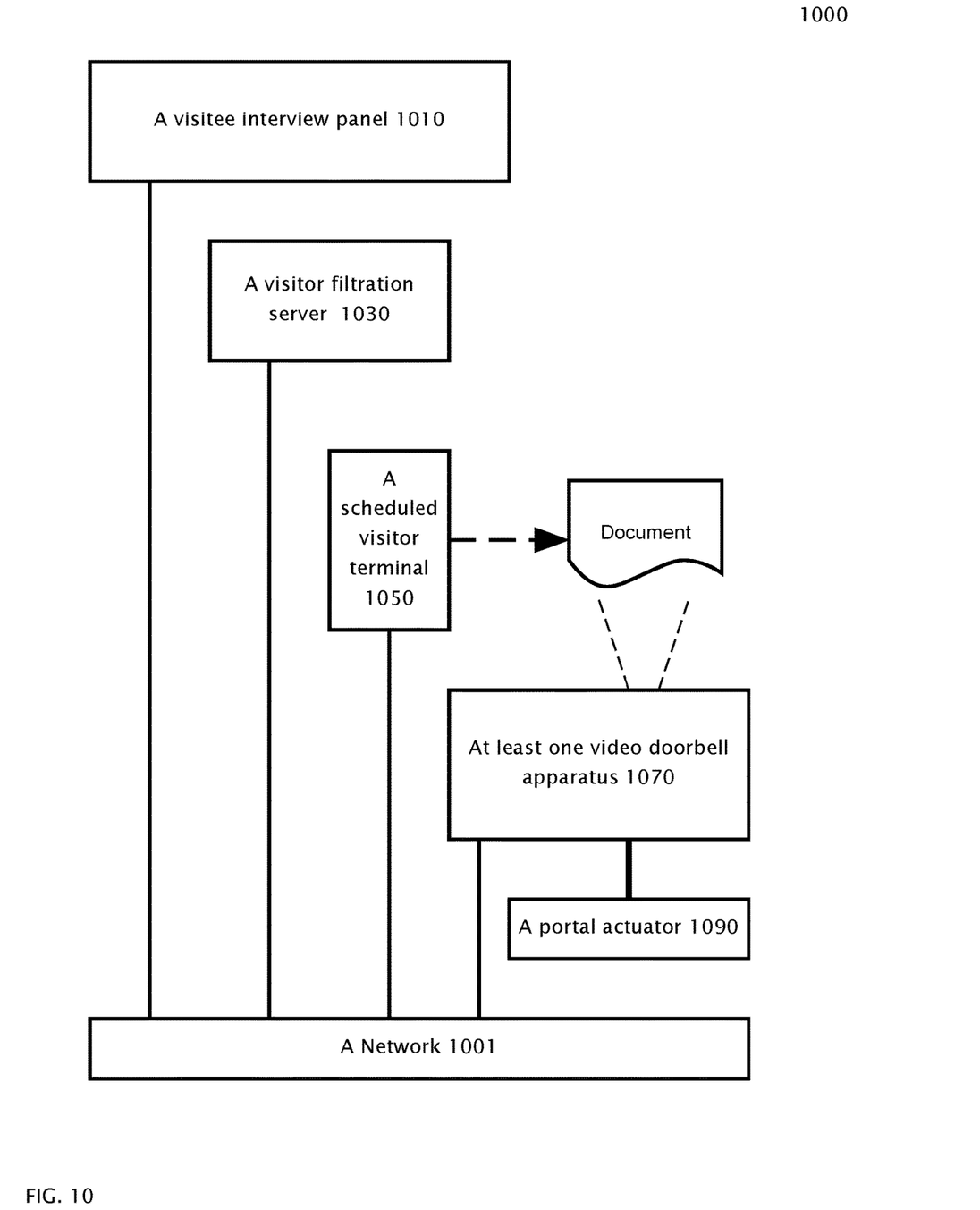
FIG. 10 is a block diagram of another embodiment of the system as referenced in FIGS. 7-9.

FIG. 10 is a block diagram of another embodiment of the system. System 1000 comprises a network 1001 mutually interconnecting a visitee interview panel 1010, a visitor filtration server 1030, a scheduled visitor terminal 1050, and at least one video doorbell apparatus 1070 coupled to a portal actuator 1090. Note that the visitor terminal may emit a non-electronic document for presentation to the video doorbell which has a scanner. Note that the scheduled visitor may still access the portal in the failover case that the network is unavailable or the panel and/or the server are not in communication with the video doorbell during the valid date-time access range. Only the doorbell and the portal actuator need be interoperable and hard wired together. The dashed lines denote unidirectional image transfer. The visitor terminal need not be present or operable at the location of the portal if the visitor has a printed image of the optical credential.

Figure 11:
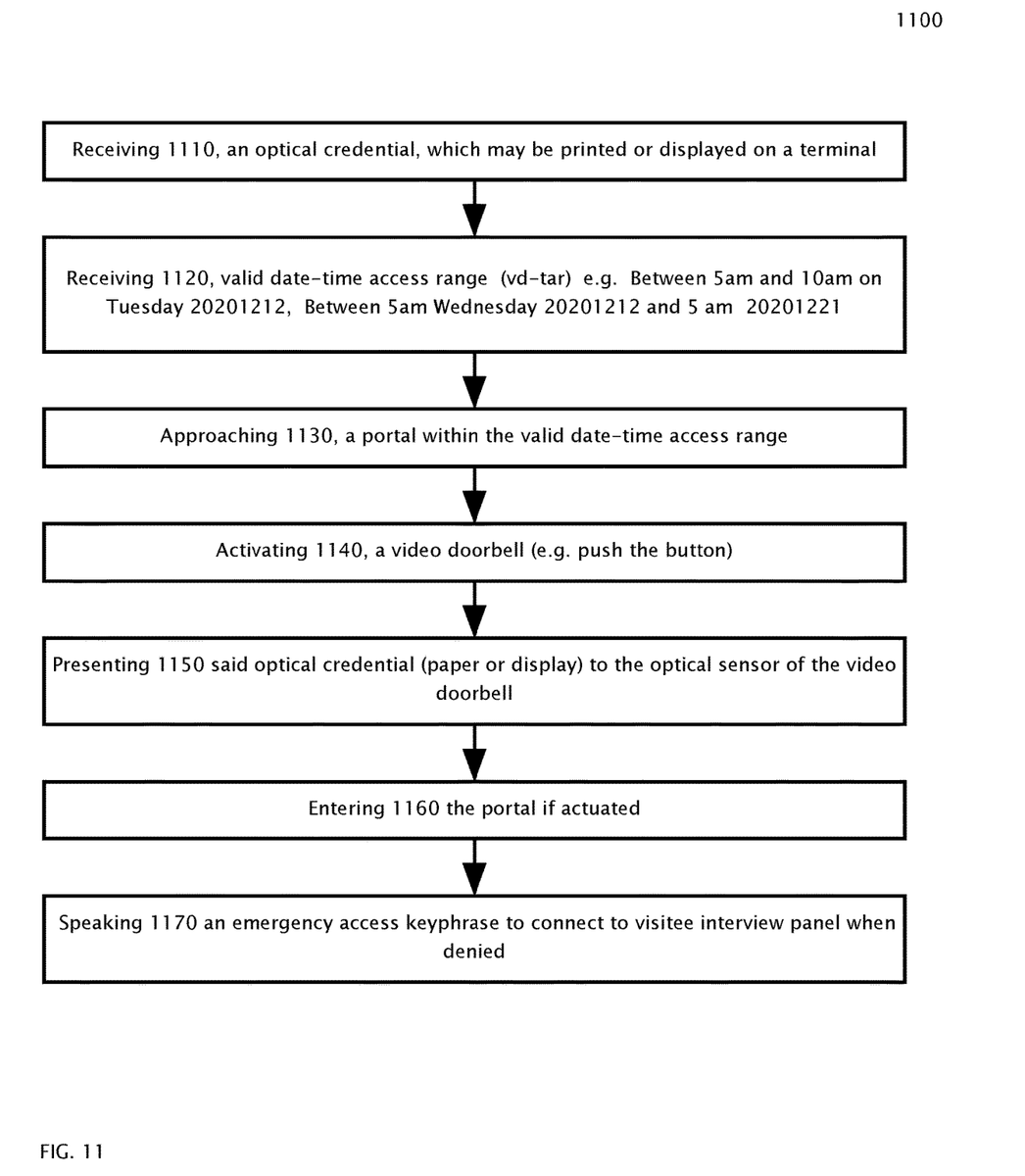
FIG. 11 is an exemplary use model for a visitor in flowchart style to assist in comprehension.

FIG. 11 is an exemplary use model for a visitor. To assist in comprehension of the aspects of the invention, an exemplary non-limiting method of use by a scheduled visitor is illustrated in FIG. 11: One method 1100 of scheduled visitor, e.g. AirBnB renter, includes the concepts of, receiving 1110, an optical credential, which may be printed or displayed on a terminal; receiving 1120, valid date-time access range (vd-tar) e.g. Between 5 am and 10 am on Tuesday 2020 Dec. 12, Between 5 am Wednesday 2020 Dec. 12 and 5 am 2020 Dec. 21; approaching 1130, a portal within the valid date-time access range; activating 1140, a video doorbell (e.g. push the button); presenting 1150, said optical credential (paper or display) to the optical sensor of the video doorbell; entering 1160 the portal if actuated; and else, speaking 1170, an emergency access key phrase to connect to visitee interview panel when denied.

Other embodiments of the invention include a system comprising a video doorbell (videoorbell); an intercommunication portal (IP); and a visitor filtration apparatus coupling said IP and said videoorbell, whereby a visitee operator may anticipate a visitor with certain date-time schedule and visitor indicia, store a greeting to be presented by the videoorbell upon matching said visitor indicia within said date-time schedule, and relay a message from videoorbell to intercommunication portal following a policy stored by the visitee operator. In an embodiment, said visitor filtration apparatus comprises a processor coupled to a policy In an embodiment, certain visitor indicia causes one of recording, transforming, storing, and forwarding a message to a visitee interview panel, and direct real-time connection to a legal services intermediary interview panel. store, a visitor indicia store, an outgoing greeting store, an incoming message store, and a connection circuit to couple to the videoorbell, the visitee interview panel, the legal services intermediary interview panel, the greeting store, and the message store.

In an embodiment, an interview panel is one of a computer workstation, a mobile device, a cellular telephone, and a vehicle dashboard.

Conclusion

The present invention can be easily distinguished from conventional systems and methods for authorized smart access to a monitored property. A distinguishing characteristic of the present invention is that the optical credential may be displayed on a mobile device or printed for presentation to a video doorbell. A distinguishing characteristic of the present invention is that after the visitor filtration server has distributed information to the visitor and to the video doorbell, it not in the critical path of operating the portal and may be offline or intermittent. A distinguishing characteristic of the present invention is that the video doorbell performs the generation of the digital bit-key within the valid date-time access range. No digital bit-key exists until the optical credential is presented and is operated on by the video doorbell. A distinguishing characteristic of the present invention is that the transformation of the optical credential into either a digital bit-key or a digital bit-lock is theoretically irreversible within the life of the universe. A distinguishing characteristic of the present invention is that a digital bit-lock stored into a specific video doorbell may be over-written by the visitor filtration server to effectively withdraw validity of an optical credential and deny access to that portal. A distinguishing characteristic of the present invention is that bearer of the optical credential may not change the valid date-time range or change which video doorbell maybe operable. A distinguishing characteristic of the present invention is that the video doorbell is performing a non-reversible transformation process within the valid date-time access range. A distinguishing characteristic of the invention is that the scheduled visitor may not have a operable communication device, the network between the visitee interview panel and the visitor filtration server, and the video doorbell may be disabled, but the video doorbell may still scan a printed optical credential and actuate a portal. A distinguishing characteristic of the present invention is that the visitee may modify valid date-time access ranges and enable or disable a select video doorbell at any time without affecting the optical credential, i.e. after the visitor is enroute or out of communication.

The present invention solves the long sought key exchange problem. A voicemail/cellphone cannot solve a key exchange problem. It avoids needing a physical key (vulnerable to duplication) to be exchanged. The invention creates temporary & conditional keys.

The invention generates a new type of key that does not need physical exchange. Non-limiting examples include a physical optical credential (printed QR-code) or digital image credential (QR-code on mobile phone screen) which causes generation of the key which is temporary & conditional only at the video doorbell. The key can be effectively invalidated remotely by eliminating the lock.

Exemplary Use Cases:

First. An apartment resident uses a cleaning service once a week. The cleaner person needs to enter the apartment to clean it. She/he needs keys. The apartment resident does not want to give key to his/her cleaner because keys can be copied, misplaced, or stolen.

Our system enables a visitee to generate a temporary credential (QR-Code) (which is only valid for a period of time and in specific conditions) to show to video door bell. QR-code is captured by the video door bell. The system transforms the QR code into a key which may actuate the door. The digital lock in the door (which is managed by our access control system) enables the portal actuator. So, we don't bother the home owner (the apartment resident) in order to open the door. He might be in a meeting etc.

Temporary key can be valid for a period of time. Features: no disturbing the resident.

Second. A home owner wants to rent his apartment via AirBnB, social media, home rental web sites, etc. He needs to give the keys for a specific period of time (for a couple of days, etc) to a tenant. He does not want to give physical keys to tenant, because the keys could be copied and he would need to spend time to meet him. Our invention solves this issue by temporary & conditional digital keys. The tenant does not need a cellphone. He just shows printed QR-code to the videodoorbell in order to enter the home. A start and end date-time range validates the QR-code.

Third. Certain family members may need access in an emergency or unexpected time range. Stored visitor indicia such as face or voice biometrics and keywords using speech to text can override policies of when to directly connect to an interview panel or actuate physical access control, yet avoid nuisance doorbell ringing by mischievous, disoriented or hostile trespassers.

As is known, circuits disclosed above may be embodied by programmable logic, field programmable gate arrays, mask programmable gate arrays, standard cells, and computing devices limited by methods stored as instructions in non-transitory media.

Generally a computing devices 600 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A computing device may execute, operate or otherwise provide an application, which can be any type and/or form of software, program, or executable instructions, including, without limitation, any type and/or form of web browser, web-based client, client-server application, an ActiveX control, or a Java applet, or any other type and/or form of executable instructions capable of executing on a computing device.

Figure 6:
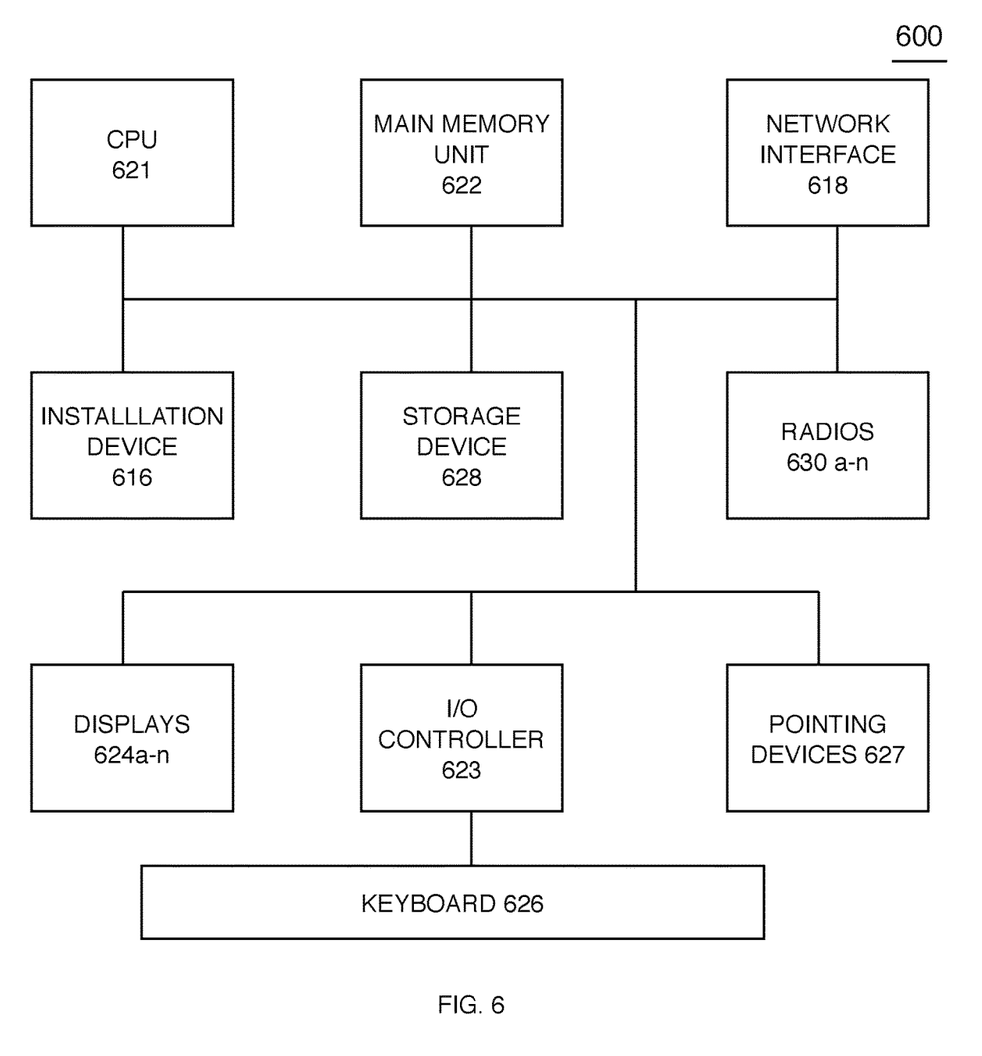
FIG. 6 is a block diagram of a processor suitable for performance of the method according to executable instructions stored in non-transient computer-readable media.

FIG. 6 depicts block diagrams of a computing device 600 useful for practicing an embodiment of the invention. As shown in FIG. 6, each computing device 600 includes a central processing unit 621, and a main memory unit 622. A computing device 600 may include a storage device 628, an installation device 616, a network interface 618, an I/O controller 623, display devices 624*a-n* a keyboard 626, a pointing device 627, such as a mouse or touchscreen, and one or more other I/O devices 630*a-n* such as baseband processors, Bluetooth, GPS, and Wi-Fi radios. The storage device 628 may include, without limitation, an operating system and software.

The central processing unit 621 is any logic circuitry that responds to and processes instructions fetched from the main memory unit 622. In many embodiments, the central processing unit 621 is provided by a microprocessor unit, such as: those manufactured under license from ARM; those manufactured under license from Qualcomm; those manufactured by Intel Corporation of Santa Clara, Calif.; those manufactured by International Business Machines of Armonk, N.Y.; or those manufactured by Advanced Micro Devices of Sunnyvale, Calif. The computing device 600 may be based on any of these processors, or any other processor capable of operating as described herein.

Main memory unit 622 may be one or more memory chips capable of storing data and allowing any storage location to be directly accessed by the microprocessor 621. The main memory 622 may be based on any available memory chips capable of operating as described herein.

Furthermore, the computing device 600 may include a network interface 618 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 600 communicates with other computing devices 600 via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 600 to any type of network capable of communication and performing the operations described herein.

A computing device 600 of the sort depicted in FIG. 6 typically operates under the control of operating systems, which control scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 10, manufactured by Microsoft Corporation of Redmond, Wash.; MAC OS and iOS, manufactured by Apple Inc., of Cupertino, Calif.; or any type and/or form of a Unix operating system.

In some embodiments, the computing device 600 may have different processors, operating systems, and input devices consistent with the device. In other embodiments, the computing device 600 is a mobile device, such as a JAVA-enabled cellular telephone or personal digital assistant (PDA). The computing device 600 may be a mobile device such as those manufactured, by way of example and without limitation, Kyocera of Kyoto, Japan; Samsung Electronics Co., Ltd., of Seoul, Korea; or Alphabet of Mountain View Calif. In yet other embodiments, the computing device 600 is a smart phone, Pocket PC Phone, or other portable mobile device supporting Microsoft Windows Mobile Software.

In some embodiments, the computing device 600 comprises a combination of devices, such as a mobile phone combined with a digital audio player or portable media player. In another of these embodiments, the computing device 600 is device in the iPhone smartphone line of devices, manufactured by Apple Inc., of Cupertino, Calif. In still another of these embodiments, the computing device 600 is a device executing the Android open source mobile phone platform distributed by the Open Handset Alliance; for example, the device 600 may be a device such as those provided by Samsung Electronics of Seoul, Korea, or HTC Headquarters of Taiwan, R.O.C. In other embodiments, the computing device 600 is a tablet device such as, for example and without limitation, the iPad line of devices, manufactured by Apple Inc.; the Galaxy line of devices, manufactured by Samsung; and the Kindle manufactured by Amazon, Inc. of Seattle, Wash.

As is known, circuits include gate arrays, programmable logic, and processors executing instructions stored in non-transitory media provide means for scheduling, cancelling, transmitting, editing, entering text and data, displaying and receiving selections among displayed indicia, and transforming stored files into displayable images and receiving from keyboards, touchpads, touchscreens, pointing devices, and keyboards, indications of acceptance, rejection, or selection.

It should be understood that the systems described above may provide multiple ones of any or each of those components and these components may be provided on either a standalone machine or, in some embodiments, on multiple machines in a distributed system. The phrases in one embodiment, in another embodiment, and the like, generally mean the particular feature, structure, step, or characteristic following the phrase is included in at least one embodiment of the present disclosure and may be included in more than one embodiment of the present disclosure. However, such phrases do not necessarily refer to the same embodiment.

The systems and methods described above may be implemented as a method, apparatus or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be PHP, PROLOG, PERL, C, C++, C #, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip, electronic devices, a computer-readable non-volatile storage unit, non-volatile memory, such as semiconductor memory devices, including EPROM, EEPROM, and flash memory devices; magnetic disks such as internal hard disks and removable disks; magneto-optical disks; and nanostructured optical data stores. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for video surveillance, it will now become apparent to one of skill in the art that other embodiments incorporating the concepts of the disclosure may be used. Therefore, the disclosure should not be limited to certain embodiments, but rather should be limited only by the spirit and scope of the following claims.

We claim:

1. A method of operation for a visitor filtration system having a visitee interview panel, a visitor filtration server, a video doorbell, the method comprising:
   at the visitee interview panel,
      receiving a valid date-time access range for a scheduled visitor,
      receiving an identity indicia for said scheduled visitor,
      receiving indicia of the video doorbell which said scheduled visitor may activate within said valid date-time access range;
   at the visitor filtration server,
      generating an optical credential for said scheduled visitor,
      transmitting said optical credential to a terminal of said scheduled visitor,
      transmitting a location of said video doorbell to said scheduled visitor's terminal,
      transmitting said valid date-time access range to said scheduled visitor's terminal, and,
      enabling said video doorbell to activate a digital bit-lock by a digital bit-key;
   wherein, said enabling said video doorbell comprises:
      determining most significant bits of said valid date-time access range,
      generating a mask of said most significant bits, and
      generating a digital bit-lock for a combination of said optical credential and said valid date-time access range; and;
      storing into said video doorbell said generated digital bit-lock;
   at a video doorbell apparatus coupled to said visitor filtration server and to said portal actuator,
      receiving from said visitor filtration server said digital bit-lock and storing said digital bit-lock,
      generating a plurality of digital bit-keys upon activation by said scheduled visitor,
      wherein generating a plurality of digital bit-keys comprises
         receiving by an optical sensor, an optical credential,
         determining a requested access date-time upon reception of said optical credential,
         generating a plurality of masks of most significant bits of requested access date-time access,
         hashing each one of said plurality of masks and said optical credential to determine said plurality of digital bit-keys,
   and
      enabling the portal actuator when any of the plurality of digital bit-keys is verified in combination with said stored digital bit-lock.

2. The method of claim 1 wherein generating a digital bit-lock comprises
   hashing said mask of most significant bits and said optical credential to determine a hash, and
   determining a two's complement of said hash; and, wherein verification in combination is successful when any digital bit-key summed with the stored digital bit-lock has a value of zero.

3. A method of operation at a visitee interview panel, the method comprising:
   firstly, receiving a valid date-time access range for a scheduled visitor;
   secondly, receiving an identity indicia for said scheduled visitor;
   thirdly, receiving a video doorbell indicia which said scheduled visitor may activate within said valid date-time access range;
   receiving a notification from said video doorbell apparatus that a digital bit-key is two's complement of a stored digital bit-lock; and
   connecting said video doorbell to the visitee interview panel when an emergency access key phrase is detected.

4. A method of operation at a visitor filtration server, the method comprising the processes of:
   firstly, generating an optical credential for a scheduled visitor;
   secondly, transmitting said optical credential to a scheduled visitor terminal;
   thirdly, transmitting a location of a video doorbell to a scheduled visitor terminal;
   fourthly, transmitting a valid date-time access range to said scheduled visitor terminal; and,
   fifthly, enabling a video doorbell to verify a digital bit-lock in combination with a digital bit-key;
   wherein said enabling a video doorbell comprises:
      determining most significant bits of said valid date-time access range,
      generating a mask of said most significant bits,
      generating a digital bit-lock for a combination of said mask, said optical credential, and said valid date-time access range, and
      storing into said video doorbell said digital bit-lock.

5. A method of operation at a visitor filtration server, the method comprising the processes of:
   firstly, generating an optical credential for a scheduled visitor;
   secondly, transmitting said optical credential to a scheduled visitor terminal;

thirdly, transmitting a location of a video doorbell to a scheduled visitor terminal;
fourthly, transmitting a valid date-time access range to said scheduled visitor terminal; and,
fifthly, enabling a video doorbell to verify a digital bit-lock in combination with a digital bit-key;
wherein said enabling a video doorbell comprises:
  determining most significant bits of said valid date-time access range,
  generating a mask of said most significant bits,
  generating a digital bit-lock for a combination of said mask, said optical credential, and said valid date-time access range, and
  storing into said video doorbell said digital bit-lock
wherein generating a digital bit-lock comprises:
  hashing said mask of most significant bits and said optical credential to determine a hash; and
  determining the digital bit-lock by performing a two's complement of said hash.

* * * * *